(12) United States Patent
Moritani et al.

(10) Patent No.: US 7,676,139 B2
(45) Date of Patent: Mar. 9, 2010

(54) OPTICAL DISK PLAYING APPARATUS

(75) Inventors: Shuji Moritani, Osaka (JP); Shogo Sakai, Osaka (JP)

(73) Assignee: Funai Electric, Co., Ltd., Osaka (JP)

( * ) Notice: Subject to any disclaimer, the term of this patent is extended or adjusted under 35 U.S.C. 154(b) by 1227 days.

(21) Appl. No.: 11/212,626

(22) Filed: Aug. 29, 2005

(65) Prior Publication Data

US 2006/0045482 A1    Mar. 2, 2006

(30) Foreign Application Priority Data

Aug. 30, 2004 (JP) ............... P2004-250690
Sep. 28, 2004 (JP) ............... P2004-281229

(51) Int. Cl.
*H04N 7/00* (2006.01)
(52) U.S. Cl. ............... 386/95; 386/125; 386/126
(58) Field of Classification Search .............. 386/95, 386/125, 126
See application file for complete search history.

(56) References Cited

U.S. PATENT DOCUMENTS

| 6,212,330 | B1 * | 4/2001 | Yamamoto et al. | 386/95 |
| 6,553,179 | B1 | 4/2003 | Miwa et al. | 386/94 |
| 2002/0031329 | A1 | 3/2002 | Ando et al. | 386/46 |
| 2004/0057695 | A1 | 3/2004 | Kobayashi et al. | 386/46 |

FOREIGN PATENT DOCUMENTS

| EP | 0 757 350 A2 | 2/1997 |
| EP | 0 797 200 A2 | 9/1997 |
| EP | 0 866 461 A3 | 9/1998 |
| EP | 1 050 880 A1 | 11/2000 |
| JP | 09-259542 | 10/1997 |
| JP | 2003-333508 | 11/2003 |

* cited by examiner

*Primary Examiner*—Thai Tran
*Assistant Examiner*—Girumsew Wendmagegn
(74) *Attorney, Agent, or Firm*—Morgan, Lewis & Bockius LLP (57) ABSTRACT

An optical disk playing apparatus capable of reproducing information recorded on an optical disk includes a system controller. The system controller obtains an address of a navigation pack corresponding to a user's request with respect to a data having video data of still picture and audio data recorded on the optical disk, determines whether or not the obtained navigation pack has the video data of still picture, reproduces, on the basis of a predetermined information included in the obtained navigation pack, a video data of still picture which is corresponding to a head address of a preceding video object when the obtained navigation pack does not have the video data of still picture, and reproduces an audio data of the address of the navigation pack corresponding to the user's request.

2 Claims, 9 Drawing Sheets

OPTICAL DISK PLAYING APPARATUS

BACKGROUND OF THE INVENTION

1. Field of the Invention

The present invention relates to an optical disk playing apparatus that can reproduce information recorded on an optical disk in conformity, for example, with the DVD video standards, and relates particularly to an optical disk playing apparatus having a resume function that can resume reproduction at a play pause position.

2. Description of the Related Art

DVDs (Digital Versatile Disks), which are optical disks, have recently become popular. By using image data compression technology, such as MPEG2, or audio data compression technology, a variety of types of data can be stored on a DVD, as well as control data (e.g., navigation pack information) for providing an assortment of functions.

To record a movie on a DVD, for example, generally, both video data and audio data are recorded, and when data are included for subtitles in multiple languages, a subtitle in a language selected by a user can be displayed. Further, when data for still pictures, such as movie director and cast profiles are recorded, these profiles can also be displayed by user performed manipulations. Furthermore, a so-called resume function provided for an optical disk playing apparatus is one whereby, when the playing of a DVD is paused and is thereafter resumed, the reproduction of data is restarted at the pause position. As described above, an optical disk playing apparatus reads various data from the DVD, and performs various supplied functions.

Figure 1:
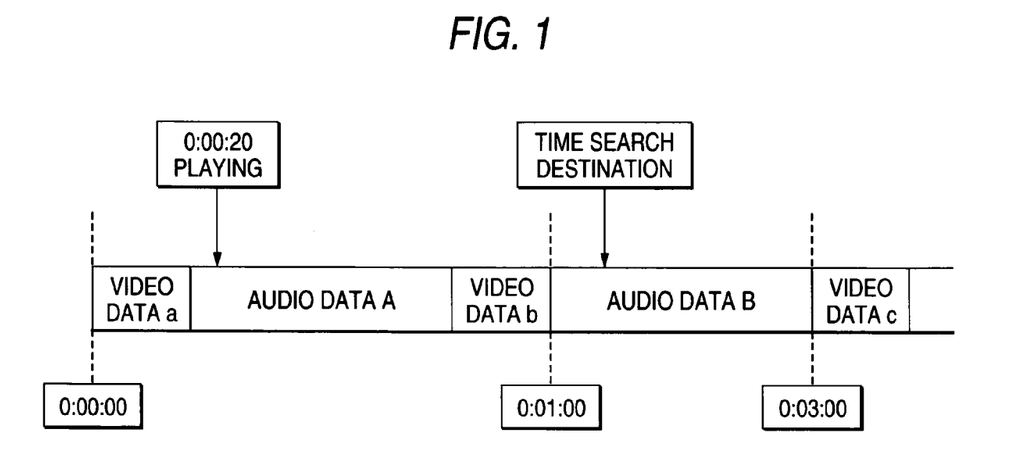
FIG. 1 is a diagram showing a data structure for explaining a time search operation for an optical disk playing apparatus according to a relater art.

FIG. 1 is a diagram showing a data structure for explaining a time search operation performed by the optical disk playing apparatus. The time search operation will now be described while referring to this data structure diagram.

In FIG. 1, when audio data A are reproduced beginning at 0:00:20, naturally, video data a are output. That is, when reproduction is started at 0:00:20, audio data A are reproduced while video data a are reproduced for one minute, from 0:00:00 to 0:01:00. In this state, when a user issues a request for a time search "0:01:10", reproduction is started at the designated time (a time search destination).

Optical disk playing apparatuses are employed for playing optical disks having large memory capacities, such as a DVDs (Digital Versatile Disks), e.g., software disks for films that last many hours. For a film software disk, generally, information signals for the story are used as the title, and are divided into a plurality of chapters. Further, a software disk for a film includes not only the story, but also a setup screen, a menu screen, a logo screen for a production company, a commercial screen, and an information screen for the copyright.

When reproduction is paused by a user while the optical disk playing apparatus is playing the optical disk, and the playing is then resumed, the state is returned to the original playing start state, the logo video for the production company and the information video for the copyright are played, and the video for the story is played. Therefore, when the user desires to view pictures beginning at with those whereat reproduction was paused, the user must wind the film fast forward while monitoring the pictures that are reproduced, and must find the location whereat playing was paused. Thus, much labor and time are required to find the location whereat the playing was previously paused.

Therefore, an optical disk playing apparatus, having a so-called resume function, that automatically searches for the location whereat playing was paused and that resumes playing at that location has already been developed and is available on the market. According to the optical disk playing apparatus that has the resume function, when the playing of an optical disk is paused, the last memory data, which include address information for a playing pause position, playing environment information and the elapsed time for a period extending from the playing start to the playing pause, a playing pause date and inherent time and disk information, are stored in a memory. Then, when the playing of the optical disk is restarted, playing is begun at the location whereat the playing was paused, based on the last memory data stored in the memory.

However, in the related art as shown in FIG. 1, a still picture based on video data b is not output, and only a still picture based on video data a is output. That is, for a optical disk playing apparatus, when a time search is performed for a DVD video slide show (data wherein only audio data is arranged following the video data for a still picture), a still picture corresponding to audio data can not be output at a designated time because of the data structure.

According to JP-A-2003-33508, it relates to a still picture control method and a still picture control apparatus for an optical disk that conforms to the DVD audio standards, and does not relate to an optical disk playing apparatus for an optical disk that conforms to the DVD video standards.

When video data are not present at a search destination, a forward search is performed to find the video data and an image is displayed according to JP-A-9-259542. However, since an image may be displayed that is shifted slightly relative to an image desired by a user, for the user, the usability would be inferior.

After a playing pause, the optical disk playing apparatus performs the following resume process for an optical disk on which data are recorded, in accordance with the DVD audio standards, that have a data structure wherein, for example, video data for a still picture, audio data, video data for a still picture and audio data are arranged.

Figure 4:
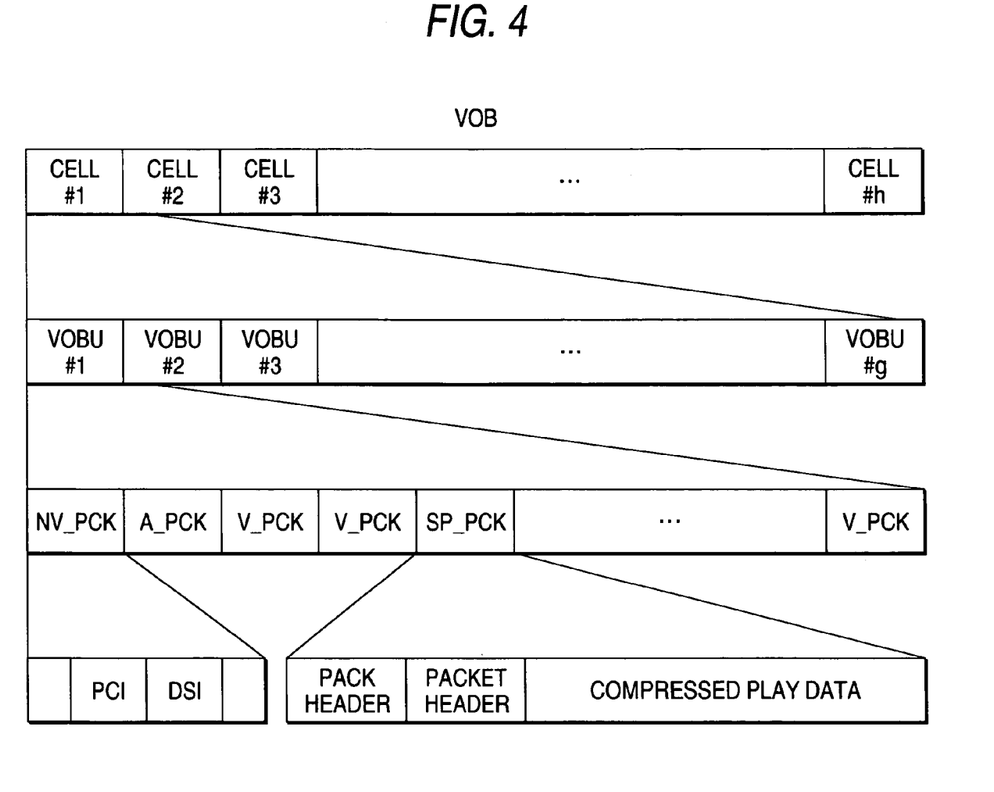
FIG. 4 is a diagram showing the data structure of a VOB (video object) recorded on an optical disk that conforms to the DVD video standards according to the first embodiment.

FIG. 4 is a diagram showing a data structure for explaining the resume process performed by an optical disk playing apparatus. In FIG. 4, V1 denotes video data for a still picture, A1 denotes audio data corresponding to the video data V1, V2 denotes video data for a still picture, A2 denotes audio data corresponding to the video data V2, V3 denotes video data for a still picture, and A3 denotes audio data corresponding to the video data V3. When playing of the optical disk on which such data are recorded is paused at a position R, the position R is the resume position, and when playing is restarted, the playing position is returned to the location whereat the video data V2 for the still picture are recorded, and playing is restarted beginning with the video data V2.

However, since the playing start position for the audio data A2 is not the resume position R2 but a position Q, the user must listen to sounds reproduced in the interval extending from the position Q to the resume position R. Therefore, for a user, the usability of the optical disk playing apparatus having such a resume function is inferior.

According to JP-A-2002-279766, simply, even when there are DSI data that can not be obtained, the reproduction of desired data is ensured, but how to resume the reproduction of data, including still picture video data and audio data, is not disclosed. According to JP-A-2002-223411, only the contiguous reproduction of a disk, including pictures such as DVD video, as desired by a user is ensured, but how to resume the reproduction of data, including still picture video data and audio data, is not disclosed. Further, according to JP-A-2002-25235, playing data preceding and following the location whereat playing was paused is enabled, as is digest reproduction. However, the optical disk playing apparatus also does not include how to resume the reproduction of data, including still picture video data and audio data.

It is an object of the invention to provide an optical disk playing apparatus that can output a still picture consonant with available audio data, even when a time search destination on an optical disk conforming to the DVD video standards is a slide show and only audio data are present at the time search destination.

It is a further object of the invention to provide an optical disk playing apparatus that, when the reproduction of data, including video data for a still picture and audio data, is paused, can search for a position whereat video data are present, even when there are no video data at a resume position, and that can reproduce audio data, together with a still picture, beginning at the resume position.

According to an aspect of the invention, an optical disk playing apparatus capable of reproducing information recorded on an optical disk, including: a system controller that includes a search time analysis unit analyzing a search time upon receiving a time search request from a user; a search destination address determination unit determining a search destination address based on the search time that is analyzed, a navigation pack acquisition unit obtaining a navigation pack at the search destination address that is determined, a head address acquisition unit, for, when video data are not found by searching the contents of the navigation pack that is obtained, extracting from data search information included in the navigation pack a head address of a preceding video object unit wherein there are video data, a video data acquisition unit, for reading data at the thus obtained head address and for obtaining only video data based on general information in the data search information included in the navigation pack; and a reproduction controller, for permitting reproduction of the video data that are obtained and for permitting reproduction of audio data that are read beginning at an address corresponding to the time designated by the time search.

With this arrangement, when a time search request is issued by a user, the search time analysis unit analyzes the search time, and based on this search time, the search destination address determination unit determines a search destination address. At the search destination address, the navigation pack acquisition unit obtains the navigation pack and searches the contents thereof. When video data are not present in this navigation pack, the head address acquisition unit extracts from data search information included in the navigation pack the head address of a preceding video object unit wherein there are video data. Then, the data for the obtained head address are read, and based on general information concerning the data search information included in the navigation pack, the video data acquisition unit obtains only video data. Thereafter, the reproduction controller permits the reproduction of the thus obtained video data and of the audio data that are read beginning at the address corresponding to the time designated by the time search. As a result, a still picture consonant is output with the audio data.

According to this arrangement, even when the time search destination on the optical disk conforming to the DVD video standards is a slide show and only audio data are present, a still picture consonant with the audio data can be output, and the usability can be improved for a user.

According to another aspect of the invention, the system controller is operable to determine a search destination address based on a search time that is analyzed in response to a time search request on the basis of the user's request. The system controller is operable to obtain a navigation pack at the search determination address that is determined. The system controller is operable to search contents of the navigation pack that is determined. The system controller is operable to extract from data search information included in the obtained navigation pack the head address of a preceding video object unit wherein there are video data, when the obtained navigation pack does not have the video data of still picture. The system controller is operable to read a data at the obtained head address, thereby to obtain only video data of still picture included in the preceding video object at the obtained head address. The system controller is operable to reproduce audio data beginning at an address that corresponds to the time designated by the time search on the basis of the user's request.

With this arrangement, when a time search request is issued by a user, the search time is analyzed, a search time address is determined based on the analyzation of the search time, and a navigation pack is obtained for the search destination address that is determined. Then, the contents of the navigation pack are searched, and when video data are not present, the head address of a preceding video object unit wherein there are video data is obtained from data search information included in the navigation pack. Thereafter, data for the head address are read and only video data are obtained, based on general information included with the data search information in the navigation pack. Subsequently, the obtained video data are reproduced, as are audio data that are read beginning at the address that corresponds to the time designated by the time search. As a result, a still picture consonant with audio data is output.

According to this arrangement, even when the time search destination on the optical disk that conforms to the DVD video standards is a slide show and only audio data are present, a still picture consonant with the audio data can be output, and the usability is improved for a user.

According to another aspect of the invention, for the optical disk playing apparatus of the second aspect, acquisition of only the video data is performed by reading data at the head address, and is based on general information included with the data search information in the navigation pack. Therefore, a still picture consonant with the audio data can be output.

According to another aspect of the invention, for the optical disk playing apparatus of the second aspect, the system controller includes: a search time analysis unit, for analyzing a search time upon receiving a time search request from a user; a search destination address determination unit, for determining a search destination address based on the search time that is analyzed; a navigation pack acquisition unit, for obtaining a navigation pack at the search destination address that is determined; a head address acquisition unit, for, when video data are not found by searching the contents of the navigation pack that is obtained, extracting from data search information included in the obtained navigation pack a head address of a preceding video object unit whereat video data are present; a video data acquisition unit, for reading data at the thus obtained head address and for obtaining only video data based on general information included with the data search information in the navigation pack; and a reproduction controller, for permitting reproduction of the video data that are obtained, and for permitting reproduction of the audio data that are read beginning at an address corresponding to the time designated by the time search. Therefore, an arrangement can be provided wherein, even when a time search destination on an optical disk that conforms to the DVD video standards is a slide show and only video data are present, a still picture consonant with the audio data can be output.

According to another aspect of the invention, an optical disk playing apparatus comprises a system controller including: a first address acquisition unit, for obtaining an address of a navigation pack, located at a resume position, during a process performed to acquire resume information when the reproduction of data, including still picture video data and audio data, recorded on an optical disk is halted; a second address acquisition unit, for obtaining an address of a navigation pack indicating video data are present; an address comparator, for determining whether the two obtained addresses match; a video reproduction controller, for, when the two addresses do not match, displaying a still picture on a display device by reproducing video data at the address of the navigation pack that indicates video data are present; an address replacement unit, for, after the still picture has been displayed, replacing, as a reproduction target, the address of the navigation pack indicating video data are present with the address of the navigation pack located at the resume position; and an audio reproduction controller, for permitting audio data reproduction to begin at the address of the navigation pack at the resume position.

According to this arrangement, when the playing of an optical disk 1 is halted by the depression of a stop key, the first address acquisition unit obtains the address of the navigation pack at the resume position, and the second address acquisition unit obtains the address of the navigation pack indicating video data are present. Then, the address comparator determines whether the two addresses match. When the two address do not match, the video reproduction controller first reproduces video data at the address of the navigation pack indicating video data are present, and displays a still picture on the display device.

After the still picture has been displayed, as a reproduction target, the address replacement unit replaces the address of the navigation pack indicating video data are present with the address of the navigation pack at the resume position. Thereafter, the audio reproduction controller permits audio data reproduction to begin at the address of the navigation pack at the resume position provided by the replacement.

With this arrangement, when the reproduction of data, including still picture video data and audio data, is paused, a position whereat video data are present can be searched for even when video data are not present at the resume position, and beginning at the resume position, audio data, together with the still picture video data, can be reproduced. Usability, therefore, is improved, for a user, while viewing the still picture, can listen to the music that immediately follows the location at which reproduction was paused.

According to another aspect of the invention, the system controller is operable to obtain an address of the navigation pack at a resume position and an address of the navigation pack indicating a video data of still picture is present in case that a resume information is acquired when a reproduction of the data is paused based on the user's request. The system controller is operable to reproduce a video data of still picture at the address of the navigation pack indicating the video data of still picture is present when it is determined that the two addresses do not match. The system controller is operable to display the still picture on a display device. The system controller is operable to replace the address of the video data to be reproduced with the address of the navigation pack located at the resume position so that the audio data of the address of the navigation pack corresponding to the user's request is reproduced.

According to this arrangement, when reproduction is paused, the address of the navigation pack at the resume position and the address of the navigation pack indicating video data are present are obtained, and when the two addresses do not match, video data at the address of the navigation pack indicating video data are present are reproduced, and a still picture is displayed on the display device. Thereafter, as a reproduction target address, the address of the navigation pack indicating video data are present is exchanged with the address of the navigation pack located at the resume position, and audio data are reproduced.

According to this arrangement, when reproduction of data, including still picture video data and audio data, is paused, the position where video data are present can be searched for even when video data are not present at the resume position, and beginning at the resume position, audio data can be reproduced with the still picture. Usability, therefore, is improved, for a user, while viewing the still picture, can listen to the music that immediately follows the location at which playing was paused.

According to another aspect of the invention, for the optical disk playing apparatus of the second aspect, the system controller includes: a first address acquisition unit for obtaining an address of a navigation pack at a resume position, during a process performed to acquire resume information when the reproduction of data, to include still picture video data and audio data, recorded on an optical disk is paused; a second address acquisition unit for obtaining an address of a navigation pack indicating video data is present; an address comparator for determining whether the two addresses that are obtained match; a video reproduction controller, for, when the two addresses do not match, reproducing video data at the address of the navigation pack indicating video data are present and for displaying a still picture on the display device; an address replacement unit, for, after the still picture has been displayed, replacing, as a reproduction target address, the address of the navigation pack indicating video data is present with the address of the navigation pack located at the resume position; and an audio reproduction controller for permitting reproduction beginning with audio data at the address of the navigation pack located at the resume position provided by the replacement. Thus, when reproduction of data, including still picture video data and audio data, is paused, the position whereat video data are present can be searched for even when video data are not present at the resume position, and beginning with the resume position, audio data, together with a still picture, can be reproduced.

According to the above-aspects of the invention, the optical disk playing apparatus comprises a system controller that includes: a search time analysis unit, for analyzing a search time upon receiving a time search request from a user; a search destination address determination unit, for determining a search destination address based on the search time that is analyzed; a navigation pack acquisition unit, for obtaining a navigation pack at the search destination address that is determined; a head address acquisition unit, for, when video data are not found by searching the contents of the navigation pack that is obtained, extracting from data search information included in the obtained navigation pack a head address of a preceding video object unit wherein video data are present; a video data acquisition unit, for reading data at the thus obtained head address and for obtaining only video data based on general information contained in the data search information included in the navigation pack; and a reproduction controller, for permitting reproduction of the video data that are obtained, and for permitting reproduction of audio data that are read beginning at an address corresponding to the time designated by the time search. Therefore, even when a time search destination on an optical disk that conforms to the DVD video standards is a slide show, and only video data are present, a still picture consonant with the audio data can be output, and usability is improved for a user.

According to the above-aspects of the invention, the optical playing apparatus also includes a system controller that determines a search destination address based on search time that is analyzed in response to a time search request issued by a user; obtains a navigation pack at the search determination address that is determined; searches the contents of the navigation pack that is determined, and when video data are not present, extracts from data search information included in the obtained navigation pack a head address of a preceding video object unit that has video data; reads data at the obtained head address, and obtains and reproduces only video data; and reads and reproduces audio data beginning at an address corresponding to a time designated by a time search. Therefore, even when a time search destination on an optical disk that conforms to the DVD video standards is a slide show, and only video data are present, a still picture consonant with the audio data can be output, and usability is improved for a user.

According to the above-aspects of the invention, an optical disk playing apparatus comprises a system controller that includes: a first address acquisition unit for obtaining an address of a navigation pack at a resume position in the process for acquiring resume information when the reproduction of data, including still picture video data and audio data, recorded on an optical disk, is paused;

a second address acquisition unit for obtaining an address of a navigation pack indicating video data are present;

an address comparator for determining whether the two addresses obtained match;

a video reproduction controller for, when the two addresses do not match, reproducing video data at the address of the navigation pack indicating video data are present, and for displaying a still picture on the display device;

an address replacement unit for, after the still picture has been displayed, replacing, as a reproduction target address, the address of the navigation pack indicating video data are present with the address of the navigation pack located at the resume position; and an audio reproduction controller for permitting reproduction beginning with audio data at the address of the navigation pack located at the resume position provided by the replacement. With this arrangement, when reproduction of data, including video data for a still picture and audio data, is paused, the position where video data are present can be searched for even when video data are not present at the resume position, and beginning with the resume position, audio data can be reproduced together with a still picture. Thus, while seeing the still picture, the user can listen to music beginning at where playing was paused, and usability is improved.

According to the above-aspects of the invention, the optical disk playing apparatus also comprises the system controller that, in a process for acquiring resume information when reproduction of data including video data for a still picture and audio data recorded on an optical disk is paused, obtains an address of a navigation pack at a resume position and an address of a navigation pack indicating video data are present; when the two addresses do not match, reproduces the video data at the address of the navigation pack indicating video data are present and displays a still picture on a display device; and thereafter returns an address to be reproduced to the address of the navigation pack located at the resume position so as to reproduce audio data. With this arrangement, when reproduction of data, including video data for a still picture and audio data, is paused, the position where video data are present can be searched for even when video data are not present at the resume position, and beginning with the resume position, audio data can be reproduced together with a still picture. Thus, while seeing the still picture, the user can listen to music beginning at where playing was paused, and usability is improved.

DESCRIPTION OF THE PREFERRED EMBODIMENTS

The first embodiment of the present invention will now be described while referring to the accompanying drawings.

Figure 3:
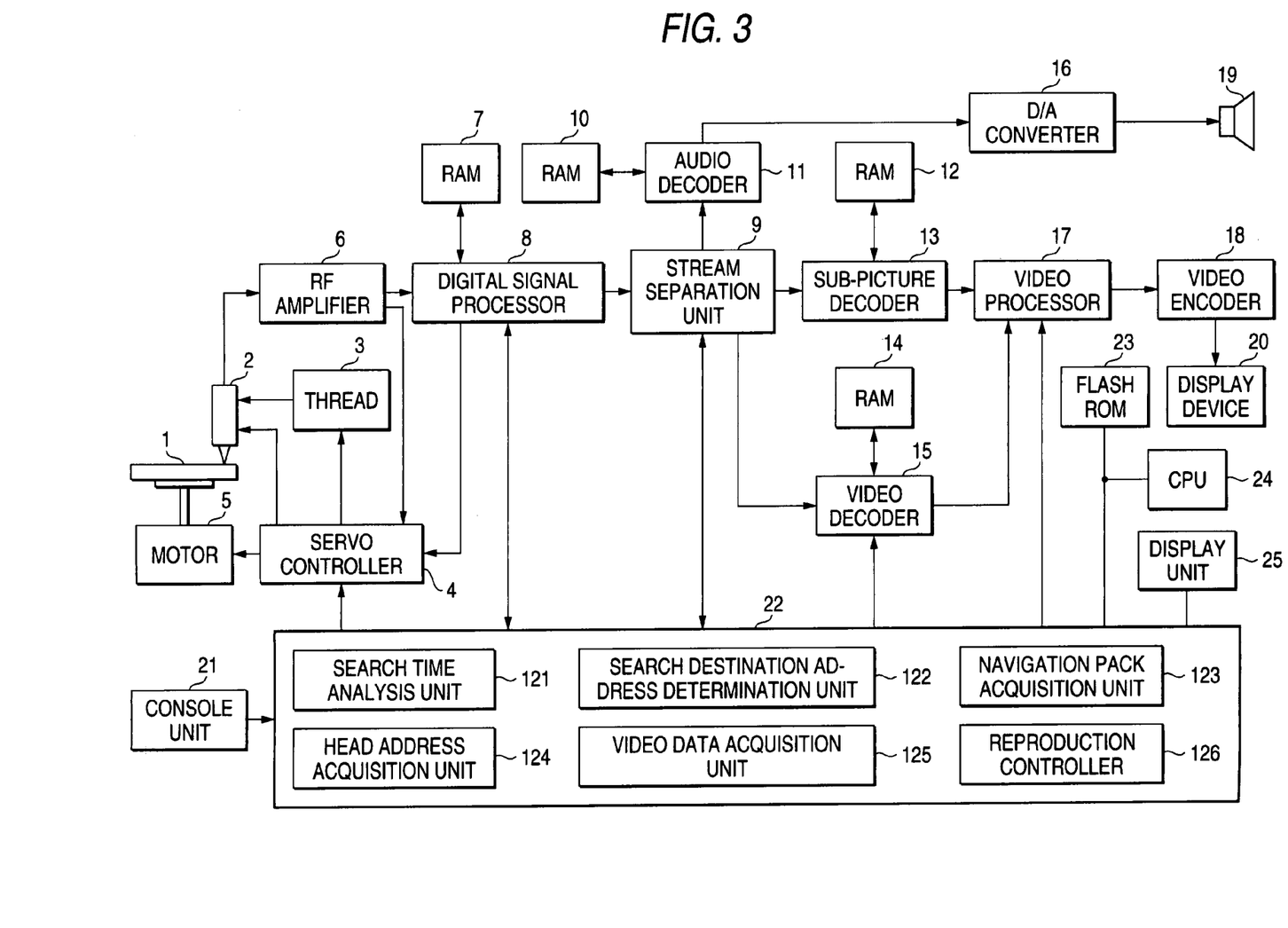
FIG. 3 is a block diagram showing the configuration of an optical disk playing apparatus according to first embodiment of the present invention.

FIG. 3 is a block diagram showing the configuration of an optical disk playing apparatus according to a first embodiment of the invention. The optical disk playing apparatus comprises: a spindle motor 5, for rotating an optical disk 1; an optical pickup 2, for emitting a laser beam to reproduce data recorded on the optical disk 1 and for receiving light reflected from the optical disk 1; a thread 3, for moving the optical pickup 3 in the radial direction of the optical disk 1; and a servo controller 4, for driving the spindle motor 5 and the thread 3, in accordance with an instruction received from a system controller 22, and for moving an object lens (not shown) incorporated in the optical pickup 2 to shift the focal position of the laser beam vertically or horizontally relative to the recording face of the optical disk 1.

The optical disk playing apparatus also includes: an RF amplifier 6, for, during reproduction of the optical disk 1, amplifying an RF signal, a read signal, that is transmitted by the optical pickup 2; a digital signal processor 8, for converting the RF signal, output by the RF amplifier 6, into digital data and performing, in consonance with the data format of the optical disk 1, a signal decoding process and an error correction process for the digital data, and for storing the resultant data in a RAM 7; and a stream separation unit 9, for, in accordance with an instruction received from the system controller 22, separating audio data, sub-picture data and video data from a data stream output by the digital signal processor 8.

The optical disk playing apparatus further includes: an audio decoder 11, for performing a predetermined decoding process for the audio data received from the stream separation unit 9; a RAM 10, used to temporarily store data for a decoding process performed by the audio decoder 11; a sub-picture decoder 13, for performing a predetermined decoding process for the sub-picture data received from the stream separation unit 9; a RAM 12, used for the temporary storage of data for the decoding process performed by the sub-picture decoder 13; a video decoder 15, for performing a predetermined decoding process for the video data received from the stream separation unit 9; and a RAM 14, used for the temporary storage of data for the decoding process performed by the video decoder 15.

The optical disk playing apparatus additionally includes: a video processor 17, for, in accordance with an instruction issued by the system controller 22, synthesizing data output by the video decoder 15 with data output by the sub-picture decoder 13; a video encoder 18, for converting synthesized data output by the video processor 17 into a display video signal and displaying a picture on a display device 20; and a D/A converter 16, for converting data output by the audio decoder 11 into an analog audio signal and transmitting the analog audio signal to a loudspeaker 19, for example.

Furthermore, the optical disk playing apparatus includes: a console unit 21, having various operating keys, such as a play key, for entering a play instruction for the system controller 22, and a pause key, for entering a pause instruction; and the system controller 22, for controlling the entire apparatus. The console unit 21 may be either a remote controller or a console unit provided on the operation panel of the main body of the apparatus.

The optical disk playing apparatus also includes: a flash ROM 23 in which a program, for controlling the individual constituents of the apparatus or for controlling the entire apparatus, and data are stored; a CPU 24 that performs operations in accordance with the program and the data stored in the flash ROM 23, and that controls the system controller 22; and a RAM 25, in which data are temporarily stored.

The system controller 22 includes: a search time analysis unit 121, for analyzing a search time upon receiving a search time request from a user; a search destination address determination unit 122, for determining a search destination address based on the search time that is analyzed; a navigation pack acquisition unit 123, for obtaining a navigation pack at the search destination address that is determined; a head address acquisition unit 124, for searching the contents of the navigation pack that is obtained, and when video data are not present, extracting from data search information included in the navigation pack the head address of a preceding video object unit that has video data; a video data acquisition unit 125, for reading data for the head address that is obtained and for obtaining only video data based on general information included in the data search information in the navigation pack; and a reproduction controller 126, for permitting reproduction of the obtained video data and of the audio data that are read beginning at the address corresponding to the time designated by the time search.

FIG. 4 is a diagram showing the data structure of a VOB (video object) recorded on an optical disk that conforms to the DVD video standards according to the first embodiment.

In FIG. 4, a VOB includes a plurality of cells, each of which includes a plurality of VOBU (video object units). Each VOBU (video object unit) includes at least one NV_PCK (navigation pack), one V_PCK (video pack), one SP_PCK (sub-picture pack) and one A_PCK (audio pack).

The NV_PCK (navigation pack) information includes PCI (play control information) and DSI (data search information) The PCI (play control information) and the DSI (data search information) indicate, for example, the amount of data for the VOBU (video object unit), a play period extending from the start of playing of the title to the start of playing of a corresponding VOBU (video object unit), and the position of the next VOBU (video object unit) to be played. Further, the DSI (video search information) also includes BWDI (backward information) indicating the head address of the preceding VOBU that has video data. When resume playing is enabled for the currently used optical disk, the PCI (playing control information) also includes resume enabling information so as to determine that resume playing is enabled.

The V_PCK (video pack), the SP_PCK (sub-picture pack) and the A_PCK (audio pack) include a pack header indicating information concerning the play data type (a moving picture, a sub-picture or audio), a packet header, and compressed play data (video data, sub-picture data or audio data).

Figure 5:
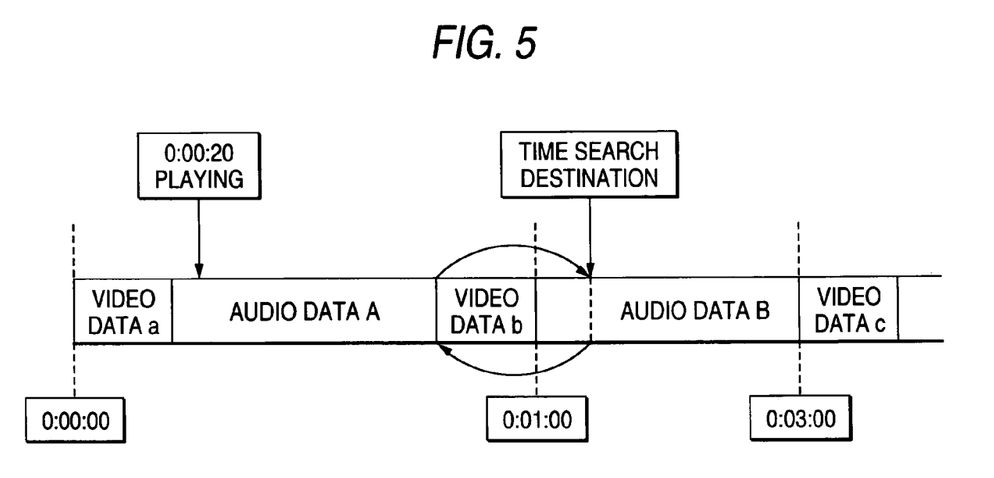
FIG. 5 is a diagram showing a data structure for explaining a time search operation according to the first embodiment.

FIG. 5 is a diagram showing a data structure for explaining a time search operation according to the first embodiment. The time search operation will now be explained while referring to this data structure diagram.

In FIG. 5, when audio data A are reproduced beginning at 0:00:20, naturally, video data a are output. That is, when playing is started at 0:00:20, audio data A are reproduced while video data a are reproduced for one minute from 0:00:00 to 0:01:00. In this state, when time search "0:01:10" is issued by a user, a NV-PCK (navigation pack) for a designated time (a time search destination) is obtained, and BWDI (backward information) for DSI (data search information) included in the NV_PCK (navigation pack) is obtained. Based on the BWDI (backward information), the head address of video data b can be obtained, i.e., based on the BWDI (backward information) for the DSI (data search information), the position of video data b is identified.

Thereafter, address data are read at the obtained head address, and only video data are obtained based on DSI_GI (data search information general information) included in the NV_PCK (navigation pack) and are transmitted to the video decoder 15 (see FIG. 3). As a result, a still picture consonant with the video data b is displayed on the display device 20 (see FIG. 1). Further, audio data B are reproduced in accordance with the address corresponding to the time designated by the time search.

Figure 6:
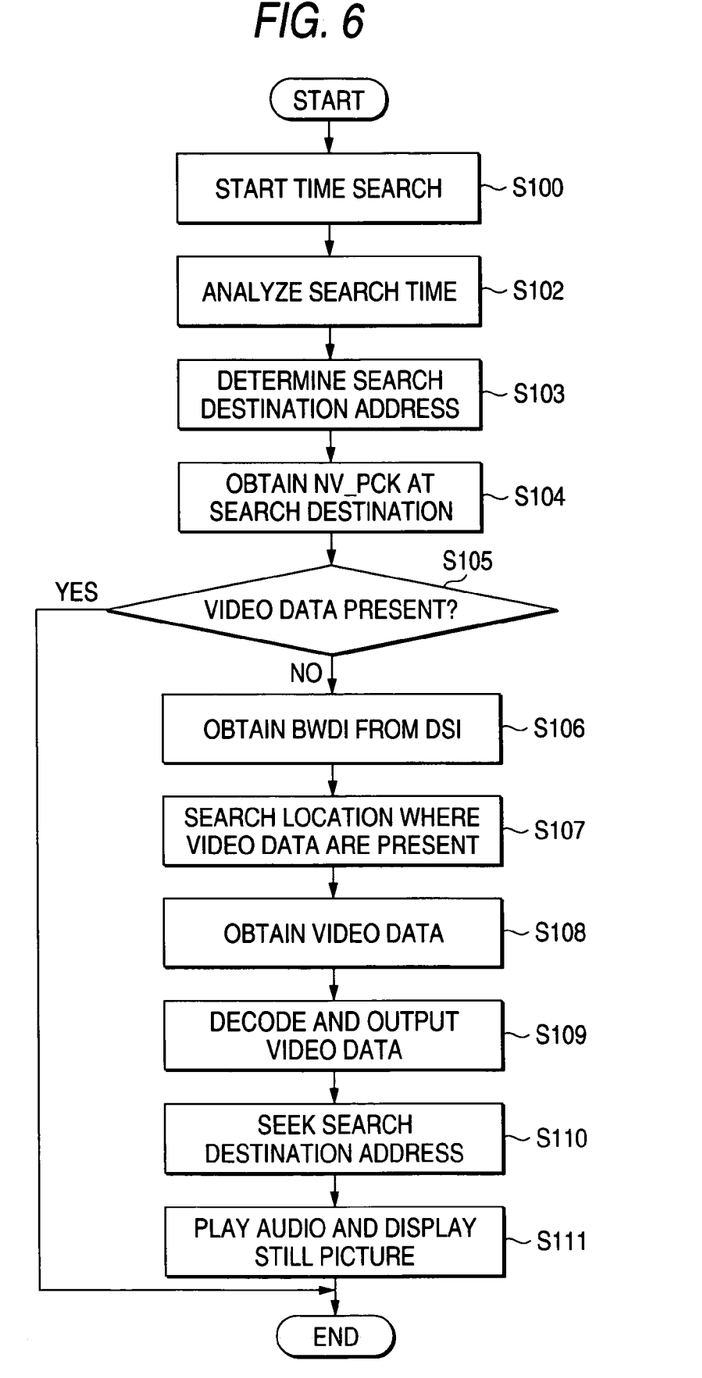
FIG. 6 is a flowchart for explaining the time search operation for the first embodiment.

FIG. 6 is a flowchart for explaining the time search operation for the first embodiment. The time search operation for the embodiment will now be described while referring to this flowchart.

When a user issues a time search request by manipulating the console unit 21, the time search processing is initiated (step S100) and the search time analysis unit 121 of the system controller 22 analyzes a search time (step S102), and based on the analyzed search time, the search destination address determination unit 122 determines a search destination address (step S103). Then, the navigation pack acquisition unit 123 obtains an NV_PCK (navigation pack) at the search destination address that is so determined (step S104).

The contents of the obtained NV_PCK (navigation pack) are examined (whether video data are present is examined). When video data are not present (step S105), the head address acquisition unit 124 obtains, from general information for DSI (data search information) included in the obtained NV_PCK (navigation pack), the head address of a preceding video object unit that has video data (step S106). Sequentially, the location where video data are present is searched for (step S107), and data at the obtained head address are read. Then, the video data acquisition unit 125 obtains only video data based on the general information for the data search information included in the NV_PCK (navigation pack) (step S108).

Thereafter, the reproduction controller 126 permits reproduction of the obtained video data, i.e., decodes and outputs the video data (step S109), and also permits the reproduction of audio data that are read beginning at the address corresponding to the time designated by the time search (a process for seeking the search destination address) (step S110) As a result, even when a time search destination on an optical disk that conforms to the DVD video standards is a slide show, and only video data are present, a still picture consonant with the audio data can be output (step S11), and usability is improved for a user.

According to the first embodiment, even when a time search destination on an optical disk that conforms to the DVD video standards is a slide show and only video data are present, a still picture consonant with the audio data can be output, and usability is improved for a user.

A second embodiment of the present invention will now be described while referring to the accompanying drawings.

Figure 7:
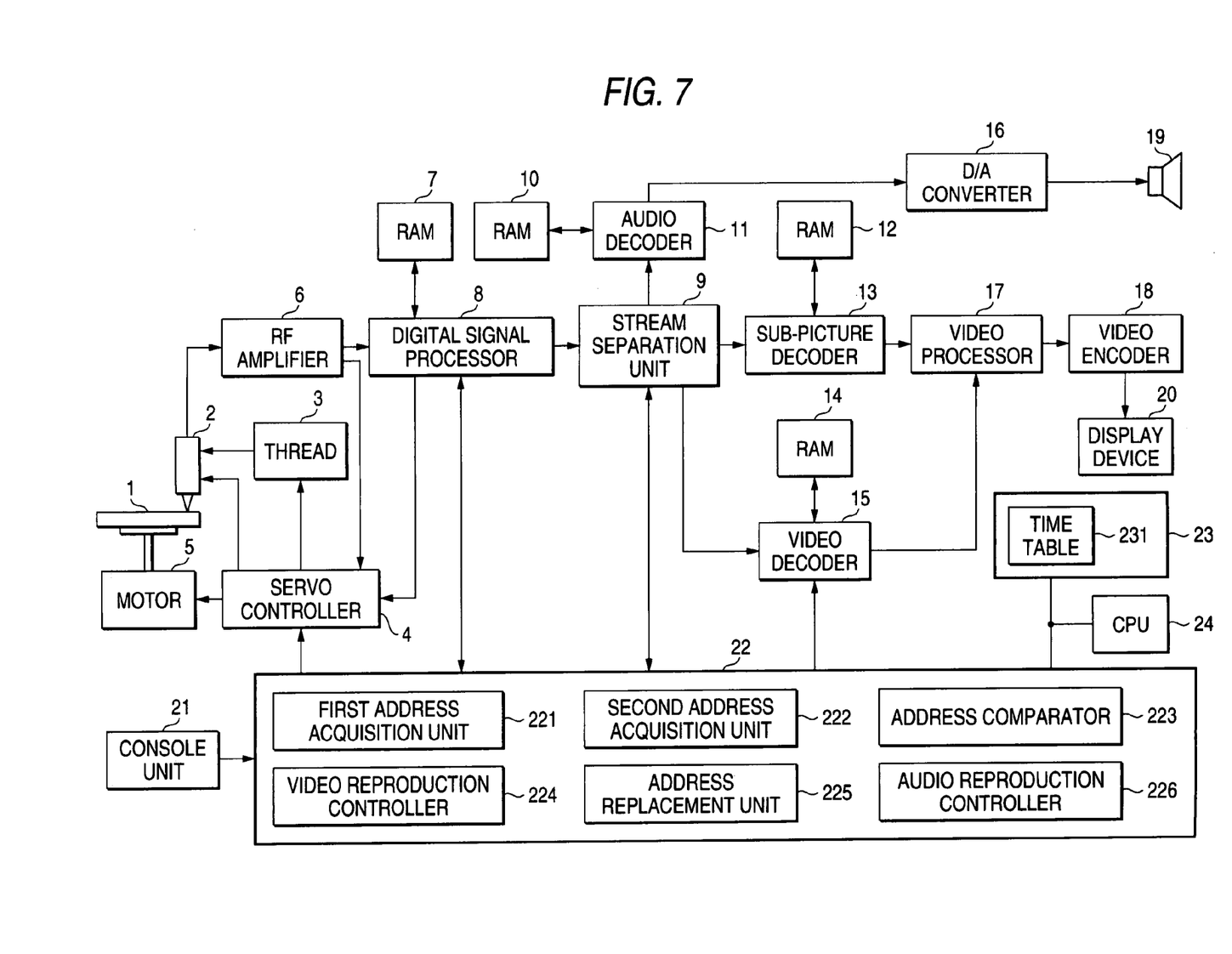
FIG. 7 is a block diagram showing the configuration of an optical disk playing apparatus according to a second embodiment of the present invention.

FIG. 7 is a block diagram showing the configuration of an optical disk playing apparatus according to the second embodiment of the invention. The optical disk playing apparatus comprises: a spindle motor 5, for rotating an optical disk 1; an optical pickup 2, for emitting a laser beam to reproduce data recorded on the optical disk 1 and for receiving light reflected from the optical disk 1; a thread 3, for moving the optical pickup 3 in the radial direction of the optical disk 1; and a servo controller 4, for driving the spindle motor 5 and the thread 3, in accordance with an instruction received from a system controller 22, and for moving an object lens (not shown) incorporated in the optical pickup 2 to shift the focal position of the laser beam vertically or horizontally relative to the recording face of the optical disk 1.

The optical disk playing apparatus also includes: an RF amplifier 6, for, during reproduction of the optical disk 1, amplifying an RF signal, a read signal, that is transmitted by the optical pickup 2; a digital signal processor 8, for converting the RF signal, output by the RF amplifier 6, into digital data and performing, in consonance with the data format of the optical disk 1, a signal decoding process and an error correction process for the digital data, and for storing the resultant data in a RAM 7; and a stream separation unit 9, for, in accordance with an instruction received from the system controller 22, separating audio data, sub-picture data and video data from a data stream output by the digital signal processor 8.

The optical disk playing apparatus further includes: an audio decoder 11, for performing a predetermined decoding process for the audio data received from the stream separation unit 9; a RAM 10, used to temporarily store data for a decoding process performed by the audio decoder 11; a sub-picture decoder 13, for performing a predetermined decoding process for the sub-picture data received from the stream separation unit 9; a RAM 12, used for the temporary storage of data for the decoding process performed by the sub-picture decoder 13; a video decoder 15, for performing a predetermined decoding process for the video data received from the stream separation unit 9; and a RAM 14, used for the temporary storage of data for the decoding process performed by the video decoder 15.

The optical disk playing apparatus additionally includes: a video processor 17, for, in accordance with an instruction issued by the system controller 22, synthesizing data output by the video decoder 15 with data output by the sub-picture decoder 13; a video encoder 18, for converting synthesized data output by the video processor 17 into a display video signal and displaying a still picture on a display device 20; and a D/A converter 16, for converting data output by the audio decoder 11 into an analog audio signal and transmitting the analog audio signal to a loudspeaker 19, for example.

Furthermore, the optical disk playing apparatus includes: a console unit 21, having various operating keys, such as a play key, for entering a play instruction for the system controller 22, and a pause key, for entering a pause instruction; and the system controller 22, for controlling the entire apparatus. The console unit 21 may be either a remote controller or a console unit provided on the operation panel of the main body of the apparatus.

The optical disk playing apparatus also includes: a flash ROM 23 in which a program, for controlling the individual constituents of the apparatus or for controlling the entire apparatus, and data are stored; and a CPU 24 that performs operations in accordance with the program and the data stored in the flash ROM 23, and that controls the system controller 22.

The system controller 22 includes: a first address acquisition unit 221, for obtaining an address of a navigation pack at a resume position during a process performed to acquire resume information when reproduction is paused; a second address acquisition unit 222, for obtaining an address of a navigation pack indicating that video data are present; an address comparator, for determining whether the two addresses that are obtained match; a video reproduction controller 224, for, when the two addresses do not match, reproducing video data at the address of the navigation pack indicating video data are present and displaying a still picture on the display device 20; an address replacement unit, for, after the still picture has been displayed, replacing, as a reproduction target address, the address of the navigation pack indicating that video data are present with the address of the navigation pack located at the resume position; and an audio reproduction controller 226, for permitting reproduction beginning with audio data at the address of the navigation pack located at the resume position.

The data structure of DVD audio data to be reproduced by the optical disk playing apparatus is as follows.

In the data structure for DVD audio, a video object set (VOBS) includes a plurality of video objects (VOB), each of which includes a plurality of cells. Each video object unit (VOBU) includes a navigation pack (NV_PCK), a video pack (V_PCK) and an audio pack (A_PCK). The navigation pack (NV_PCK) and the audio pack (A_PCK) include a pack header, a system header, a packet header, play control information data and data search information (DSI).

The data search information (DSI) includes general information, video object unit search information, synchronization information and a reserved area. The video object unit search information includes video forward information, a data area and video backward information (BWDI_Video). The video forward information indicates the start address of the next video object unit (VOBU) in the video stream (the start address of the navigation pack). The video backward information (BWDI_Video) indicates the start address of the preceding video object unit (VOBU) in the video stream (the start address of the navigation pack).

Figure 8:
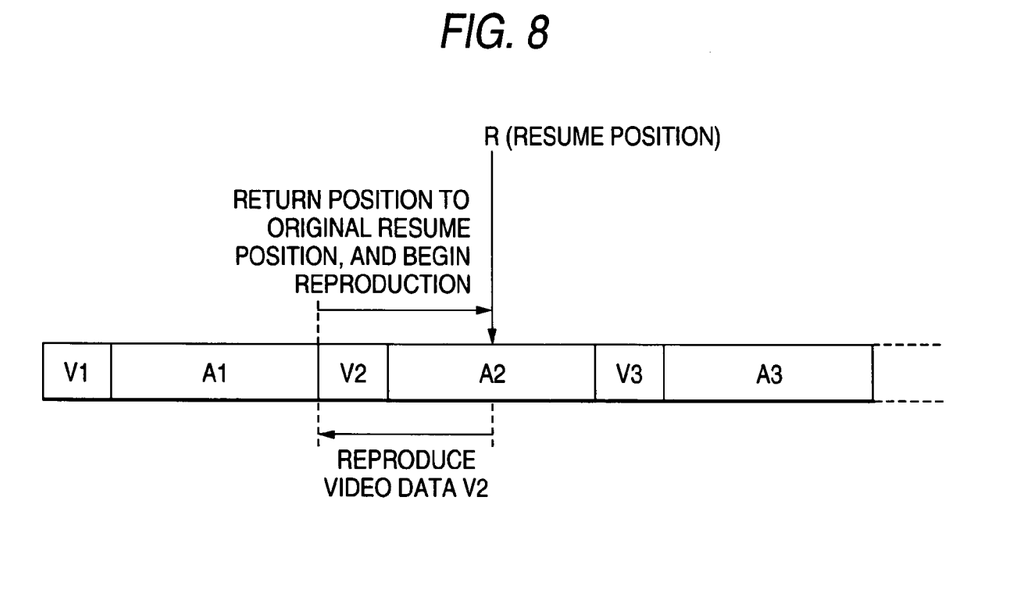
FIG. 8 is a diagram showing a data structure for explaining the resume processing performed according to the second embodiment.

FIG. 8 is a diagram showing a data structure for explaining the resume processing performed for the second embodiment. In FIG. 8, V1 denotes video data for a still picture, A1 denotes audio data corresponding to the video data V1, V2 denotes video data for a still picture, A2 denotes audio data corresponding to the video data V2, V3 denotes video data for a still picture, and A3 denotes audio data corresponding to the video data V3. When playing of the optical disk 1 on which such data are recorded is paused at a position R, the position R becomes a resume position, and when playing is started again, the audio data A2 are reproduced at the resume position R. At this time, the still picture is reproduced based on the video data V2. This resume processing is performed as shown in the following flowchart.

Figure 9:
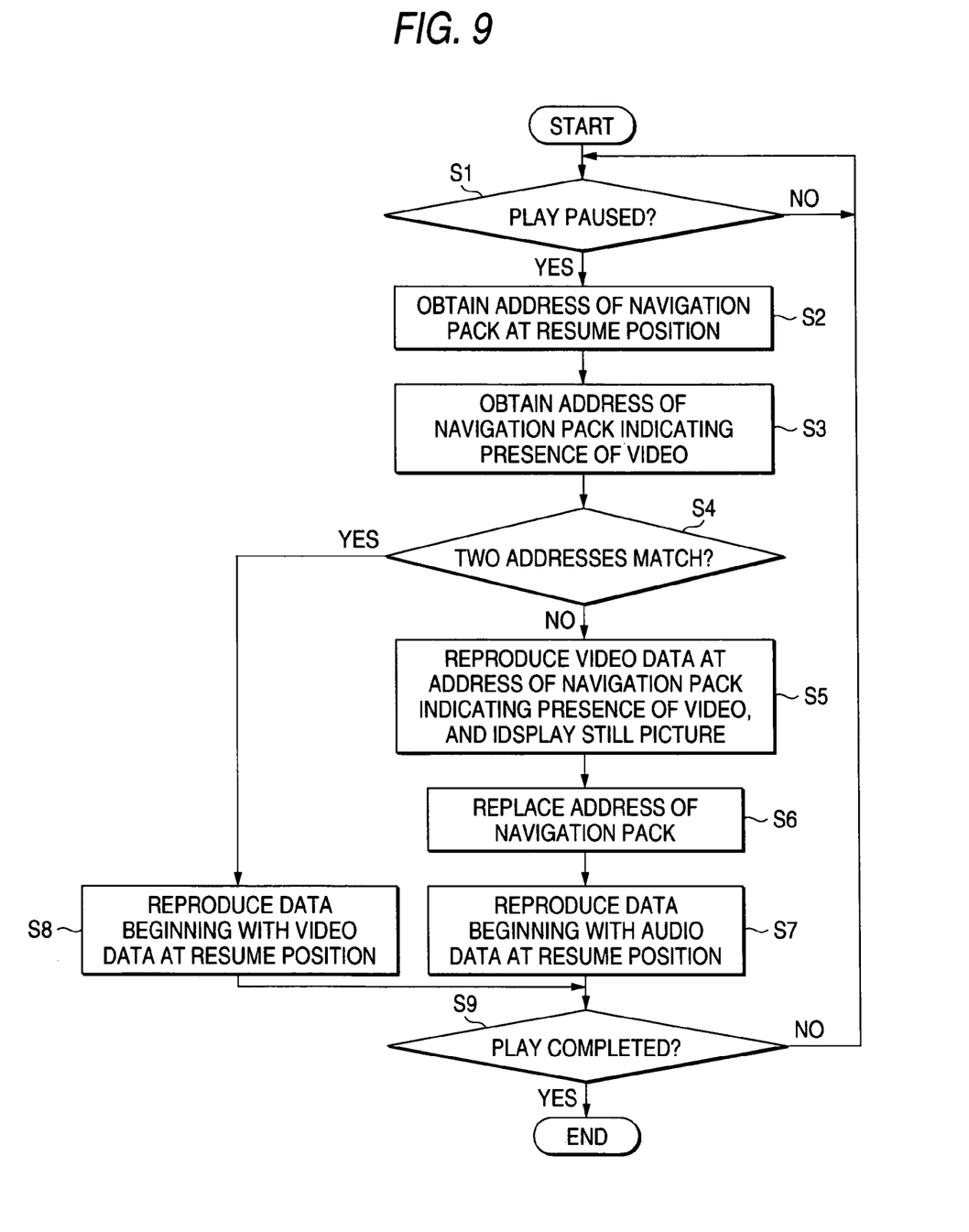
FIG. 9 is a flowchart for explaining the resume processing performed according to the second embodiment.

FIG. 9 is a flowchart for explaining the resume processing for the second embodiment. The resume processing will now be described while referring to this flowchart.

Figure 2:
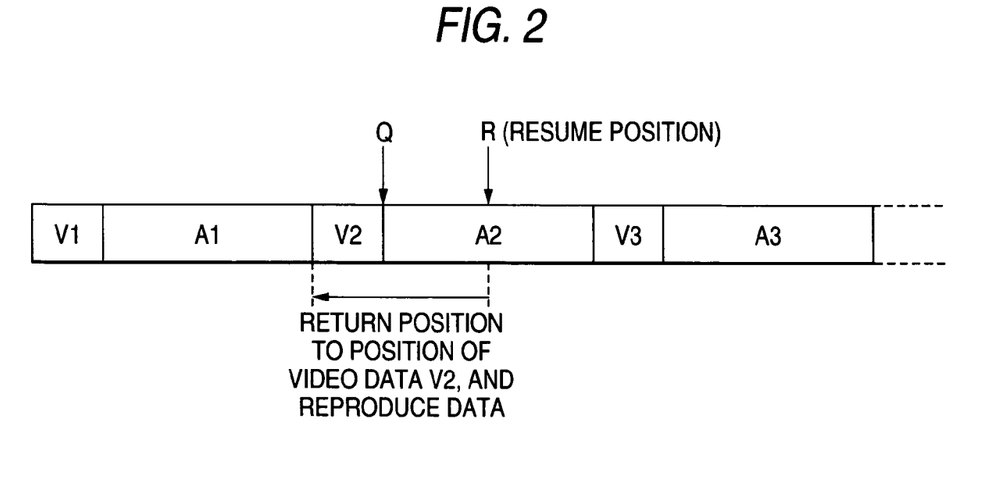
FIG. 2 is a diagram showing a data structure for explaining the resume processing performed by an optical disk playing apparatus according to a related art.

When the optical disk 1 is inserted in the optical disk playing apparatus, playing is started by pressing the play key of the console unit 21. Thereafter, when playing is paused by pressing the pause key, the system controller 22 detects that the reproduction of data has been paused (step S1). Then, the first address acquisition unit 221 of the system controller 22 obtains the address of the navigation pack at the resume position (step S2). For example, as shown in FIG. 2, the address is obtained at which audio data A2, while being played, was paused at the resume position R.

Next, the second address acquisition unit 222 obtains the address of the navigation pack indicating that video data is present (step S3). For example, as shown in FIG. 8, the address of video data V2 is obtained. This address can be acquired in accordance with the backward information (BWDI_Video) of the data search information (DSI) described above. Thereafter, the address comparator 223 compares the address obtained at step S2 with the address obtained at step S3 to determine whether the two addresses match (step S4).

When the two addresses match, it is assumed that the resume position is at the address of the navigation pack indicating that video data is present, and reproduction is performed in order beginning with the video data present at the resume position (step S8). When the reproduction of data has been completed (step S9), the resume processing is terminated.

When the two addresses do not match (step S4), the video reproduction controller 224 first reproduces video data at the address of the navigation pack indicating that video data is present, and displays a still picture on the display device 20 (step S5). The video reproduction controller 224 reproduces video data V2 as shown, for example, in FIG. 8.

After the still picture has been displayed, as a reproduction target address, the address replacement unit 225 replaces the address of the navigation pack indicating that video is present with the address of the navigation pack located at the resume position (step S6). Thereafter, as shown, for example, in FIG. 8, the address is returned to the address at the original resume position R. The audio reproduction controller 226 then permits reproduction beginning with the audio data at the address of the navigation pack at the resume position (step S7). As a result, as shown, for example, in FIG. 8, the audio data A2 is again reproduced, beginning at the resume position R.

Through this processing, even when video data are not present at the resume position, the position where video data are present can be searched for, and audio data and a still picture can be reproduced beginning at the resume position. That is, when playing is paused at a position where no video data are present, a still picture can be reproduced and the reproduction of audio data can be resumed at the correct position. Therefore, while watching a still picture, a user can listen to music beginning at the location at which reproduction was paused, and the usability is improved.

What is claimed is:

1. An optical disk playing apparatus comprising:
a system controller including:
a first address acquisition unit obtaining an address of a navigation pack located at a resume position during a process performed to acquire resume information when the reproduction of data, including still picture video data and audio data, recorded on an optical disk is halted;
a second address acquisition unit obtaining an address of a navigation pack indicating video data are present;
an address comparator determining whether the two obtained addresses match;
a video reproduction controller, for, when the two addresses do not match, displaying a still picture on a display device by reproducing video data at the address of the navigation pack that indicates video data are present;
an address replacement unit, for, after the still picture has been displayed, replacing, as a reproduction target, the address of the navigation pack indicating video data are present with the address of the navigation pack located at the resume position; and
an audio reproduction controller, for permitting audio data reproduction to begin at the address of the navigation pack at the resume position.

2. An optical disk playing apparatus capable of reproducing information recorded on an optical disk, comprising:
a system controller for:
obtaining an address of a navigation pack corresponding to a user's request with respect to a data having video data of still picture and audio data recorded on the optical disk;
determining whether or not the obtained navigation pack has the video data of still picture;
extracting, from data search information included in the obtained navigation pack, a head address of a preceding video object unit wherein there are video data when the obtained navigation pack does not have the video data of still picture; and
reproducing the video data of still picture which corresponds to the extracted head address of the preceding video object unit together with an audio data of the address of the navigation pack corresponding to the user's request;
wherein the system controller is operable to obtain an address of the navigation pack at a resume position and an address of the navigation pack indicating a video data of still picture is present in case that a resume information is acquired when a reproduction of the data is paused based on the user's request;
the system controller is operable to reproduce a video data of still picture at the address of the navigation pack indicating the video data of still picture is present when it is determined that the two addresses do not match;
the system controller is operable to display the still picture on a display device; and
the system controller is operable to replace the address of the video data to be reproduced with the address of the navigation pack located at the resume position so that the audio data of the address of the navigation pack corresponding to the user's request is reproduced; and
the system controller includes:
a first address acquisition unit obtaining the address of the navigation pack at the resume position and the address of the navigation pack indicating a video data of still picture is present in case that a resume information is acquired when a reproduction of the data is paused based on the user's request;
a second address acquisition unit for obtaining the address of the navigation pack indicating video data is present;
an address comparator determining whether the obtained two addresses match;

a video reproduction controller, for, when the two addresses do not match, reproducing the video data at the address of the navigation pack indicating video data are present and for displaying the still picture on the display device;

an address replacement unit, for, after the still picture has been displayed, replacing, as are production target address, the address of the navigation pack indicating the video data is present with the address of the navigation pack located at the resume position; and an audio reproduction controller permitting reproduction beginning with the audio data at the address of the navigation pack located at the resume position provided by the replacement.

* * * * *